US012679684B2

(12) United States Patent
Mao et al.

(10) Patent No.: US 12,679,684 B2
(45) Date of Patent: Jul. 14, 2026

(54) ROLLER, INSPECTION METHOD AND APPARATUS, COIL CONVEYING METHOD AND APPARATUS, DEVICE AND MEDIUM

(71) Applicant: CONTEMPORARY AMPEREX TECHNOLOGY (HONG KONG) LIMITED, Hong Kong (CN)

(72) Inventors: Yuyang Mao, Ningde (CN); Zhipeng Zhang, Ningde (CN); Hongyuan Li, Ningde (CN); Ping Jiang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 276 days.

(21) Appl. No.: 18/447,716

(22) Filed: Aug. 10, 2023

(65) Prior Publication Data

US 2024/0166460 A1 May 23, 2024

Related U.S. Application Data

(63) Continuation of application No. PCT/CN2023/084876, filed on Mar. 29, 2023.

(30) Foreign Application Priority Data

Nov. 23, 2022 (CN) .......................... 202211480451.0

(51) Int. Cl.
*B65H 20/02* (2006.01)
*G06T 7/70* (2017.01)
(52) U.S. Cl.
CPC .............. *B65H 20/02* (2013.01); *G06T 7/70* (2017.01); *B65H 2553/42* (2013.01); *B65H 2557/61* (2013.01)

(58) Field of Classification Search
None
See application file for complete search history.

(56) References Cited

U.S. PATENT DOCUMENTS 7,773,226 B2 * 8/2010 Hofeldt .................. B65H 43/00
356/431
8,888,225 B2 * 11/2014 Donaldson ............... B41J 11/46
347/19

(Continued)

FOREIGN PATENT DOCUMENTS

CN 109190628 A 1/2019
CN 113487567 A 10/2021
(Continued)

OTHER PUBLICATIONS

Extended European Search Report for Application No. 23750522.7, mailed Oct. 9, 2024, 8 pages.

(Continued)

*Primary Examiner* — Hua Lu
(74) *Attorney, Agent, or Firm* — Ladas & Parry, LLP

(57) ABSTRACT

This application provides a roller, an inspection method for a camera, a camera inspection apparatus, a coil conveying method, a coil conveying apparatus, an electronic device, a computer-readable storage medium, and a computer program product. The roller includes a roller body and a calibration sheet. The roller body includes a roller surface for supporting a coil; the calibration sheet is located on the roller surface of the roller body and avoids the coil, and the calibration sheet is used for inspection of the camera.

18 Claims, 8 Drawing Sheets

(56) References Cited

U.S. PATENT DOCUMENTS

| | | | | |
|---|---|---|---|---|
| 10,812,778 | B1* | 10/2020 | Wang ................. | G01B 11/0608 |
| 11,912,513 | B1* | 2/2024 | Polido ................... | B25J 9/1697 |
| 2006/0163352 | A1* | 7/2006 | Thiessen ................ | G09F 9/375 |
| | | | | 235/375 |
| 2006/0170723 | A1* | 8/2006 | Thiessen ............. | B41J 2/04506 |
| | | | | 347/16 |
| 2006/0285872 | A1* | 12/2006 | Fukuta ................ | G03G 15/161 |
| | | | | 399/99 |
| 2007/0177229 | A1* | 8/2007 | Cessel ................. | H04N 1/6033 |
| | | | | 358/406 |
| 2008/0031640 | A1* | 2/2008 | Fukui ................... | G03F 9/7003 |
| | | | | 399/9 |
| 2008/0149816 | A1* | 6/2008 | Wang ................. | G01D 5/34707 |
| | | | | 73/1.79 |
| 2009/0317149 | A1* | 12/2009 | Takura .............. | G03G 15/0131 |
| | | | | 399/301 |
| 2010/0231897 | A1* | 9/2010 | Hofeldt ................. | G01N 21/93 |
| | | | | 356/429 |
| 2012/0093550 | A1* | 4/2012 | Takemura ......... | G03G 15/2064 |
| | | | | 399/329 |
| 2012/0301009 | A1* | 11/2012 | Dabic ................... | G07D 5/005 |
| | | | | 382/136 |
| 2013/0051817 | A1* | 2/2013 | Tomita .............. | G03G 15/6585 |
| | | | | 399/15 |
| 2013/0135636 | A1* | 5/2013 | Kosuge ................. | B41J 13/009 |
| | | | | 358/1.9 |
| 2014/0009604 | A1* | 1/2014 | Hinderling ........... | G01S 7/4972 |
| | | | | 348/142 |
| 2014/0313256 | A1* | 10/2014 | Donaldson .............. | B41J 11/46 |
| | | | | 347/19 |
| 2014/0320565 | A1 | 10/2014 | Iton et al. | |
| 2017/0188015 | A1* | 6/2017 | Heidemann ......... | H04N 13/239 |
| 2017/0257005 | A1* | 9/2017 | Prucher ................. | H02K 7/088 |
| 2018/0186082 | A1* | 7/2018 | Randhawa ............ | B33Y 50/02 |
| 2019/0054734 | A1* | 2/2019 | Baran .................. | B42D 25/351 |
| 2019/0067508 | A1* | 2/2019 | Spotti .................... | H10F 71/00 |
| 2019/0283910 | A1* | 9/2019 | Taguchi ............. | G01N 21/8851 |
| 2022/0084246 | A1* | 3/2022 | Dai ...................... | H04N 17/002 |
| 2022/0288960 | A1* | 9/2022 | Peinado Gutierrez ...................... | |
| | | | | H04N 1/6033 |
| 2022/0402036 | A1* | 12/2022 | Snis ...................... | B33Y 10/00 |
| 2024/0029277 | A1* | 1/2024 | Wang .................... | H04N 7/188 |

FOREIGN PATENT DOCUMENTS

| | | |
|---|---|---|
| CN | 216763677 U | 6/2022 |
| CN | 114777658 A | 7/2022 |
| CN | 114900688 A | 8/2022 |
| CN | 115239819 A | 10/2022 |
| CN | 115849113 A | 3/2023 |
| EP | 4350278 A1 | 10/2024 |
| JP | 2019113434 A | 7/2019 |

OTHER PUBLICATIONS

ISR for International Application No. PCT/CN2023/084876 mailed Jul. 31, 2022.
Written Opinion for International Application No. PCT/CN2023/084876 mailed Jul. 31, 2022.
Office Action for European Patent Office Application EP 23750522.7, dated Mar. 21, 2025, 6 pages.
Summons to attend oral proceedings from corresponding European Patent Application No. EP23750522.7 dated Oct. 22, 2025.
Notice of Allowance from corresponding Chinese Patent Application No. 202211480451.0 dated Jan. 7, 2026.

* cited by examiner obtaining a detection image having a calibration sheet                    S210 determining location information of the calibration sheet in the detection image                    S220 judging whether a location of the camera is abnormal based on the location information of the calibration sheet                    S230

310

ROLLER, INSPECTION METHOD AND APPARATUS, COIL CONVEYING METHOD AND APPARATUS, DEVICE AND MEDIUM

CROSS-REFERENCE TO RELATED APPLICATIONS

This application is a continuation of International application PCT/CN2023/084876 filed on Mar. 29, 2023 that claims priority from Chinese Patent Application No. 202211480451.0, filed on Nov. 23, 2022. The subject matter of these applications is incorporated herein by reference in their entirety.

TECHNICAL FIELD

This application relates to the technical field of batteries, in particular, to a roller, an inspection method for a camera, a camera inspection apparatus, a coil conveying method, a coil conveying apparatus, an electronic device, a computer-readable storage medium, and a computer program product.

BACKGROUND

Energy conservation and emission reduction are key to sustainable development of the automobile industry. Electric vehicles have become an important part of the sustainable development of the automobile industry by virtue of energy saving and environmental friendliness. Battery technology is crucial to development of electric vehicles.

With the rapid development and popularization of machine vision technology, its application fields are becoming increasingly broad. As the main visual acquisition device for visual applications, cameras have a wide range of application scenarios. In the battery preparation process, it is usually necessary to calibrate a sampling camera before image detection by computer vision, that is, to determine the relationship between a physical location of a point on the surface of a space object and its corresponding point in an image, a geometric model of camera imaging is established, and these geometric modeling parameters are camera parameters under the system. In most cases, these parameters will not change, but a device will inevitably experience vibrations or other objective reasons during use, leading to the deviation of relative location or angle of the camera, resulting in detection result errors.

SUMMARY

This application aims to solve at least one of the technical problems existing in the prior art. Therefore, one objective of this application is to propose a roller, an inspection method for a camera, a camera inspection apparatus, a coil conveying method, a coil conveying apparatus, an electronic device, a computer-readable storage medium, and a computer program product, so as to solve the problem of real-time inspection of cameras.

Embodiments of a first aspect of this application provide a roller, including a roller body and a calibration sheet. The roller body includes a roller surface for supporting a coil; the calibration sheet is located on the roller surface of the roller body and avoids the coil, and the calibration sheet is used for camera inspection.

In a technical solution of the embodiment of this application, by setting the calibration sheet avoiding the coil on the roller surface, the inspection for the camera can be performed on the camera while not affecting coil conveying, without the need to suspend production and remove materials, and without increasing additional workload and cost, thereby achieving the technical effect of monitoring whether a location of the camera is abnormal in real time.

In some embodiments, the calibration sheet includes a first calibration sheet and a second calibration sheet, and the first calibration sheet and the second calibration sheet are respectively close to two ends of the roller body. By setting calibration sheets at two ends respectively, the identification precision of camera inspection can be improved, thereby avoiding errors in image identification of single calibration sheet that leads to incorrect inspection results and the inability to timely found that the location of the camera is abnormal. Arranging two calibration sheets that are far apart is more conducive to identifying a calibration pattern in an image, thereby judging an offset degree of camera location.

In some embodiments, the first calibration sheet and the second calibration sheet are films, and the films are stuck to the roller surface. A size of the films is controllable, making it easy to arrange them on the roller surface in a staggered manner with the coil, thereby achieving real-time continuous inspection of the camera, and the cost is low, avoiding unnecessary expenses.

Embodiments of a second aspect of this application provides an inspection method for a camera, the camera is used for obtaining a detection image of coil conveying by a roller, and the inspection method for the camera includes: obtaining a detection image having a calibration sheet; determining location information of the calibration sheet in the detection image; and judging whether a location of the camera is abnormal based on the location information of the calibration sheet.

Whether the detection image is deformed is judged through the location information of the calibration sheet in the detection image, the calibration sheet staggered with a coil on a roller body, thereby judging whether the location of the camera is abnormal, which can achieve real-time and continuous inspection of the camera without affecting the normal conveying of the coil, reducing the workload and cost of inspection.

In some embodiments, the judging whether a location of the camera is abnormal based on the location information of the calibration sheet includes: calculating an offset parameter of a location of the calibration sheet in the detection image relative to a preset reference location based on the location information of the calibration sheet and preset reference location information; and judging whether the location of the camera is abnormal based on the offset parameter. By calculating the offset parameter of the location of the calibration sheet in the detection image relative to the preset reference location and according to the offset parameter, an abnormal degree of the location of the camera can be quantitatively judged, thereby improving the accuracy of camera inspection.

In some embodiments, the calibration sheet includes a first calibration sheet and a second calibration sheet, the location information of the calibration sheet includes first location information and second location information, the first location information is used to indicate a location of a first feature point in the first calibration sheet in the detection image, and the second location information is used to indicate a location of a second feature point in the second calibration sheet in the detection image; and the preset reference location information includes first reference location information and second reference location information, the first reference location information is used to indicate a reference location of the first feature point, and the second reference location information is used to indicate a reference location of the second feature point. Whether the detection image is deformed can be identified more accurately through the location information of two calibration sheets, thereby more accurately judging that the location of the camera is abnormal and improving the accuracy of camera inspection. By using the location information of feature points that are more easily identified as the location information of calibration sheets, the difficulty of image identification can be reduced, which is conducive to improving the accuracy of location information.

In some embodiments, the offset parameter includes at least one of a first deviation value, a second deviation value and a third deviation value; and wherein the calculating an offset parameter of a location of the calibration sheet in the detection image relative to a preset reference location based on the location information of the calibration sheet and preset reference location information includes at least one of:

(i) calculating the first deviation value based on the first location information and the first reference location information;

(ii) calculating the second deviation value based on the second location information and the second reference location information; and (iii) calculating the third deviation value based on the first location information, the second location information, the first reference location information and the second reference location information.

By using at least one of an offset condition of the first feature point, an offset condition of the second feature point, and an overall offset condition of the first feature point and the second feature point as an offset parameter to judge the offset of the location of the camera, an abnormal condition of the camera can be judged more comprehensively and accurately.

In some embodiments, the first deviation value is an offset distance in a first direction between the location of the first feature point in the detection image and the reference location of the first feature point; the second deviation value is an offset distance in the first direction between the location of the second feature point in the detection image and the reference location of the second feature point; and the third deviation value is an included angle formed between a first connecting line connecting the first feature point and the second feature point in the detection image and a second connecting line connecting the reference location of the first feature point and the reference location of the second feature point, wherein the first direction is a direction different from a vertical direction of the detection image.

By using the offset distances in the first direction of the first feature point and the second feature point and the included angle of the connecting lines of the first feature point and the second feature point relative to a connecting line of the preset reference location as offset parameters, in combination with offset parameters of two calibration sheets in a direction different from the vertical direction of the detection image, the offset condition of the calibration sheets can be identified more accurately, thereby improving the accuracy of camera inspection.

In some embodiments, the first feature point is a pattern center of the first calibration sheet, and the second feature point is a pattern center of the second calibration sheet. By using a pattern center of a calibration sheet as a corresponding feature point, the accuracy of location information of the feature point during image identification can be improved, thereby improving the precision of image identification and the accuracy of inspection.

In some embodiments, the reference location is a location of the calibration sheet in a first detection image having the calibration sheet obtained by the camera. By using the location of the calibration sheet in the first detection image having the calibration sheet obtained by the camera at a normal location as the preset reference location, a reference location corresponding to the normal location of the camera can be obtained as a benchmark for inspection judgment, which is conducive to improving the accuracy and efficiency of inspection judgment.

In some embodiments, the judging whether the location of the camera is abnormal based on the offset parameter includes: judging that the location of the camera is abnormal in response to the offset parameter being greater than a first preset threshold. By setting an acceptable offset value as the first preset threshold according to specific precision requirements, precision control during inspection can be ensured, thereby accurately identifying that the location of the camera is abnormal.

In some embodiments, the inspection method for the camera further includes: sending alarm information and/or adjustment information in response to that the location of the camera is abnormal. The alarm information and/or the adjustment information are/is sent in time when it is detected that the location of the camera is abnormal, so that the location of the camera can be adjusted in time, thereby avoiding the influence on a subsequent visual detection process.

In some embodiments, the adjustment information is sent to control the location of the camera to be adjusted in response to the offset parameter being greater than the first preset threshold and less than or equal to a second preset threshold; and/or sending the alarm information in response to the offset parameter being greater than the second preset threshold, wherein the second preset threshold is greater than the first preset threshold. Particularly, the offset degree of the camera is judged according to results obtained by inspection, and different control commands are sent according to different degrees, which can achieve automatic inspection and automatic adjustment to the maximum extent, thereby reducing times of downtime while ensuring detection precision and avoiding the influence on production efficiency.

Embodiments of a third aspect of this application provide a coil conveying method, including: controlling a camera to obtain a detection image of coil conveying by a roller; performing inspection on the camera by using the inspection method for the camera above; identifying the detection image in response to an inspection result indicating that a location of the camera is normal; and driving the roller to convey a coil based on an identification result.

According to the embodiment of this application, by combining the camera inspection with the visual detection of coil conveying, the inspection on the camera can be completed while the visual detection is performed on coil conveying, there is no need to shut down to interrupt production for inspection, and the abnormality of the camera can be found in time, thereby avoiding the influence on the accuracy of visual detection results of coil conveying.

Embodiments of a fourth aspect of this application provide a camera inspection apparatus, including an obtaining module, a determination module and a judgment module. The obtaining module is configured to obtain a detection image having a calibration sheet; the determination module is configured to determine location information of the calibration sheet in the detection image; and the judgment module is configured to judge whether a location of a camera is abnormal based on the location information of the calibration sheet.

In some embodiments, the camera inspection apparatus further includes an alarm module, configured to send alarm information in response to an inspection result indicating that the location of the camera is abnormal.

In some embodiments, the camera inspection apparatus further includes an adjustment mechanism, configured to adjust the location of the camera in response to the inspection result indicating that the location of the camera is abnormal.

Embodiments of a fifth aspect of this application provide a coil conveying apparatus, including: a roller, a camera, a camera inspection apparatus, an identification module and a driving mechanism. The camera inspection apparatus is used to perform inspection on the camera; the identification module is configured to identify a detection image obtained by the camera in response to an inspection result indicating that a location of the camera is normal; and the driving mechanism is configured to drive the roller to convey a coil based on an identification result for the detection image.

Embodiments of a sixth aspect of this application provide an electronic device, including: at least one processor; and a memory connected to the at least one processor in communication, wherein the memory stores instructions that can be executed by the at least one processor, and the instructions are executed by the at least one processor to enable the at least one processor to execute the inspection method for the camera of any one of the above or the coil conveying method.

Embodiments of a seventh aspect of this application provide a computer-readable storage medium, stored with a computer program that, when being executed by a processor, implements the inspection method for the camera of any one of the above or the coil conveying method.

Embodiments of an eighth aspect of this application provide a computer program product, including a computer program that, when being executed by a processor, implements the inspection method for the camera of any one of the above or the coil conveying method.

The above description is merely an overview of the technical solution of this application. In order to have a clearer understanding of the technical means of this application, it can be implemented according to the content of the description. Moreover, in order to make the above and other purposes, features, and advantages of this application more obvious and understandable, the specific implementations of this application are hereby listed.

BRIEF DESCRIPTION OF DRAWINGS

In the drawings, unless otherwise specified, the same or similar components or elements are represented by the same reference numerals that run through a plurality of drawings. These drawings may not necessarily be drawn to scale. It should be understood that these drawings merely depict some implementations disclosed in accordance with this application and should not be considered as limiting the scope of this application. To describe the technical solutions in embodiments of this application more clearly, the following outlines the drawings to be used in embodiments of this application. Evidently, the drawings outlined below are merely some embodiments of this application. A person of ordinary skill in the art may derive other drawings from the drawings without making any creative efforts.

Figure 1:
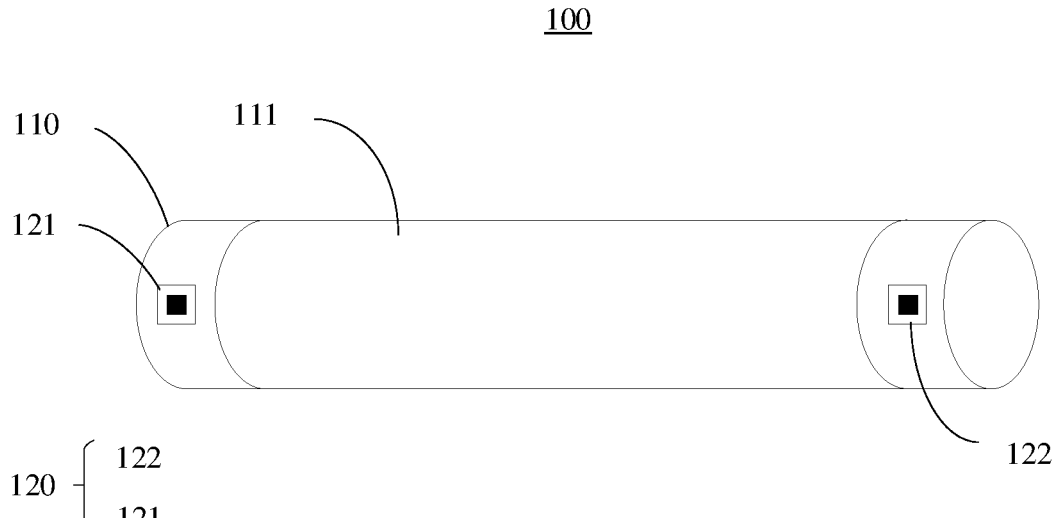
FIG. 1 is a schematic structural diagram of a roller according to some embodiments of this application.

DESCRIPTION OF REFERENCE NUMERALS coil conveying apparatus 1000;
roller 100; coil 200; camera 300; camera inspection apparatus 400; identification module 500; driving mechanism 600;
roller body 110, roller surface 111, calibration sheet 120, first calibration sheet 121, second calibration sheet 122; detection images 310, 320;
obtaining module 410; determination module 420; judgment module 430; alarm module 440; adjustment mechanism 450;
first deviation value Q1; second deviation value Q2; third deviation value Q3;
location A1 of first feature point; location A2 of second feature point; reference location A1' of first feature point; reference location A2' of second feature point; first included angle Q31; reference included angle Q32; first connecting line L1; second connecting line L2; scanning paths S1, S2.

DETAILED DESCRIPTION

The following will provide a detailed description of the embodiments of the technical solution of this application in conjunction with the drawings. The following embodiments are merely used to provide a clearer explanation of the technical solution of this application, and therefore are merely examples and cannot be used to limit the scope of protection of this application.

Unless otherwise defined, all technical and scientific terms used herein have the same meanings as those commonly understood by those of skill belonging to the technical field of this application; the terms used herein are merely for the purpose of describing specific embodiments and are not intended to limit this application; the terms "comprising/including" and "having" in the description and claims of this application as well as the brief description of drawings above, and any variations thereof, are intended to cover non-exclusive inclusion.

In the description of the embodiments of this application, the technical terms "first", "second", etc. are merely used to distinguish different objects and cannot be understood as indicating or implying relative importance or implicitly specifying the number, specific order, or primary and secondary relationship of the indicated technical features. In the description of the embodiments of this application, unless otherwise expressly specified, "a plurality of" means more than two.

The reference to "embodiments" herein means that specific features, structures, or characteristics described in conjunction with the embodiments can be included in at least one embodiment of this application. The phrase appearing in various positions in the description does not necessarily refer to the same embodiment, nor is it an independent or alternative embodiment that is mutually exclusive with other embodiments. Those of skill in the art explicitly and implicitly understand that the embodiments described herein can be combined with other embodiments.

In the description of the embodiments of this application, the term "and/or" is merely a description of the association relationship of associated objects, representing that there can be three types of relationships, such as A and/or B, which can represent the three situations: the presence of A alone, the presence of A and B simultaneously, and the presence of B alone. In addition, the character '/' herein generally represents that the pre and post associated objects are in an 'or' relationship.

In the description of the embodiments of this application, the term "a plurality of" refers to more than two (including two), similarly, "a plurality of groups" refers to more than two groups (including two groups), and "a plurality of pieces" refers to more than two pieces (including two pieces).

In the description of the embodiments of this application, the orientation or location relationship indicated by the technical terms "center", "longitudinal", "transverse", "length", "width", "thickness", "upper", "lower", "front", "back", "left", "right", "vertical", "horizontal", "top", "bottom", "inside", "outside", "clockwise", "counterclockwise", "axial", "radial", "circumferential", etc. is based on the orientation or location relationship shown in the drawings, which is merely for the convenience of describing the embodiments of this application and simplifying the description, rather than indicating or implying that the apparatus or element referred to must have a specific orientation and be constructed and operated in a specific orientation, therefore, it cannot be understood as a limitation of the embodiments of this application.

In the description of the embodiments of this application, unless otherwise expressly specified and defined, the technical terms "install", "connecting", "connection", "fix", etc. should be broadly understood, for example, they may be a fixed connection, or a detachable connection, or integration; they may also be a mechanical connection or an electrical connection; they may also be a direct connection or an indirect connection through an intermediate medium, and they may also be the internal connection between two elements or the interaction relationship between two elements. A person of ordinary skill in the art can understand the specific meanings of the above terms in the embodiments of this application in accordance with specific circumstances.

Currently, the market trend shows that power batteries are applied more extensively. Power batteries are not only used in energy storage power systems such as hydro, thermal, wind, and solar power stations, but also widely used in electric means of transport such as electric bicycles, electric motorcycles, and electric vehicles, and used in many other fields such as military equipment and aerospace. The market demand for power batteries keeps soaring with the increase of the application fields of the power batteries.

The applicant notes that during battery production, a visual system is usually used for real-time detection of a conveying device and a coil to control the production quality of batteries. In the visual system composed of cameras, the location and angle of cameras are susceptible to external interferences, such as device vibration, camera support impact, loose screws, or natural sagging. If these external interference are not monitored and timely feedback is not provided, the visual system still continues to detect, which will lead to product size measurement errors, machining movement offset, and defective products.

In order to timely find the problem of abnormal location of a camera, the applicant's research has found that an auxiliary device can be used to perform preventive check on whether the camera has any abnormalities according to the set method and cycle. The preventive check is generally called inspection, for example, visual inspection means can be used to perform inspection on the camera. The visual inspection means is to suspend operations before device running or during regular production, to remove and replace a measured object with a standard-size film ruler, and to observe the difference between a system measurement value and a standard value. However, the inspection means has the following defects: the location of the film ruler cannot be fixed each time it is stuck, and the problems of angle skew and offset cannot be found, the problems that occur during two detections cannot be found in time, and regular testing requires occupying original production time, resulting in the increase of workload.

Based on the above considerations, in order to better solve the problem that the problem of abnormal location of a camera cannot be found timely, the applicant has conducted in-depth research and designed a roller. By arranging at least one calibration sheet on a roller surface of the roller and arranging the calibration sheet in a staggered manner with a coil on the roller, a camera can obtain a detection image having the calibration sheet while scanning the coil on the roller, and by identifying the detection image and according to a location of the calibration sheet in the detection image, whether a location of the camera is abnormal is judged.

By arranging the calibration sheet at a location on the roller surface of the roller that avoids the coil, the location of the camera can be monitored in real time without affecting coil conveying by the roller, thereby timely finding the problem of abnormal location of the camera, without occupying the original production time.

The roller, the inspection method, the camera inspection apparatus, the coil conveying method and the coil conveying apparatus disclosed in embodiments of this application may be used for, but is not limited to, the preparation process of batteries, such as the preparation process of battery electrode plates, and the conveying or preparation process of other types of coils, thereby achieving that whether location of the camera is abnormal is detected in real time during normal production, and avoiding a detection error of a visual detection system caused by the inability to timely find the abnormality of the camera.

Embodiments of this application provide an electrical apparatus using a battery as a power source, and the electrical apparatus may be, but is not limited to, mobile phones, tablets, laptops, electric toys, electric tools, battery cars, electric vehicles, ships, spacecrafts, and so on. In particular, the electric toys may include fixed or mobile electric toys, such as game consoles, electric vehicle toys, electric ship toys, electric aircraft toys, and so on. The spacecrafts may include aircrafts, rockets, space shuttles, spaceships, and so on.

An electrode assembly is a component that reacts electrochemically in a battery cell. A housing may contain one or more electrode assemblies. The electrode assembly is primarily formed by winding or stacking a positive electrode plate and a negative electrode plate, and a separator is generally disposed between the positive electrode plate and the negative electrode plate. The parts, coated with an active material, of the positive electrode plate and the negative electrode plate, constitute a body portion of the electrode assembly. The part, coated with no active material, of the positive electrode plate and the negative electrode plate separately, constitutes a tab. The positive tab and the negative tab may be located at one end of the body portion together or at two ends of the body portion respectively. In a charge-and-discharge process of a battery, a positive active material and a negative active material react with an electrolytic solution. The tabs are connected to electrode terminals to form a current circuit. Taking a lithium-ion battery as an example, a positive current collector may be made of aluminum, and the positive active material may be lithium cobalt oxide, lithium iron phosphate, ternary lithium, or lithium manganate. The negative electrode plate includes a negative current collector and a negative active material layer. The negative active material layer is coated on the surface of the negative current collector. The negative current collector not coated with the negative active material layer protrudes from the negative current collector coated with the negative active material layer. The negative current collector not coated with the negative active material layer is used as the negative tab. The negative current collector may be made of copper, and the negative active material may be carbon or silicon. In the manufacturing process of the battery cell, the electrode plates are usually conveyed in a form of coil by a roller for easy machining and winding and unwinding.

FIG. 1 shows a schematic structural diagram of a roller 100 provided according to some embodiments of this application.

Embodiments of a first aspect of this application provide a roller 100. As shown in FIG. 1, the roller 100 includes a roller body 110 and a calibration sheet 120. The roller body 110 includes a roller surface 111 for supporting a coil; the calibration sheet 120 is located on the roller surface 111 of the roller body 110 and avoids the coil, and the calibration sheet 120 is used for camera inspection.

The coil refers to a workpiece that is conveyed in a film coil manner for machining or winding and unwinding, such as a battery electrode plate. The roller 100 may be a conveying roller used for conveying the coil, or a winding roller or an unwinding roller used for winding or unwinding the coil. The roller body 110 may be a cylindrical roller, and the roller surface 111 refers to a circular-arc-shaped surface of the roller body 110, and is used for supporting the coil for achieving the winding and conveying of the coil. The calibration sheet 120 has a set calibration pattern. The calibration sheet 120 avoiding the coil refers to that the calibration sheet 120 is arranged on the roller surface 111 that is staggered with the coil, so that the calibration sheet 120 can fall into a field of view of a camera without obstruction, and coil conveying will not affect the complete scanning of the calibration sheet 120 by the camera, so that inspection on the camera will not affect the normal work of the coil.

In some examples, an encoder can output a pulse signal according to a rotation angle of a roller. A camera performs scanning line by line by receiving the pulse signal, and an image sensor performs collection line by line after receiving a specified number of differential signals to obtain a detection image with a corresponding resolution. By identifying a pattern of the calibration sheet in the detection image, whether the camera is abnormal is judged.

In this embodiment, by setting the calibration sheet 120 avoiding the coil on the roller surface 111, the inspection can be performed on the camera while not affecting coil conveying, without the need to suspend production and remove materials, and without increasing additional workload and cost, thereby achieving that whether a location of the camera is abnormal is monitored in real time.

In some embodiments, as shown in FIG. 1, the calibration sheet 120 includes a first calibration sheet 121 and a second calibration sheet 122, and the first calibration sheet 121 and the second calibration sheet 122 are respectively close to two ends of the roller body 110.

The first calibration sheet 121 and the second calibration sheet 122 may be identical calibration sheets or different calibration sheets. The first calibration sheet 121 and the second calibration sheet 122 are respectively arranged on the roller surface 111 close to the two ends of the roller body 110, which is conducive to avoiding a location of the coil, thereby ensuring that the camera collects a complete calibration pattern. Since a scanning path of a camera is usually set to perform scanning in an axis direction of a roller, such arranging two calibration sheets that are far apart is more conducive to identifying a calibration pattern in an image, thereby judging an offset degree of camera location.

By setting calibration sheets at two ends respectively, the identification precision of camera inspection can be improved, thereby avoiding errors in image identification of single calibration sheet that leads to incorrect inspection results and the inability to timely found that the location of the camera is abnormal. Arranging two calibration sheets that are far apart is more conducive to identifying a calibration pattern in an image, thereby judging an offset degree of camera location.

In some embodiments, the first calibration sheet and the second calibration sheet are films, and the films are stuck to the roller surface.

A film is a type of photographic film that has excellent contrast clarity, minimal external interference error, extremely high precision, and the ability to be freely customized. Various standard film models can be selected according to different project detection precision and field of view requirements, for example, a GB30-10-FLP model film can be selected. The film may be made of plastic, and can be stuck to the roller surface through an adhesive.

A size of the films is controllable, making it easy to arrange them on the roller surface in a staggered manner with the coil, thereby achieving real-time continuous inspection of the camera, and the cost is low, reducing the cost of inspection of the camera.

Figure 2:
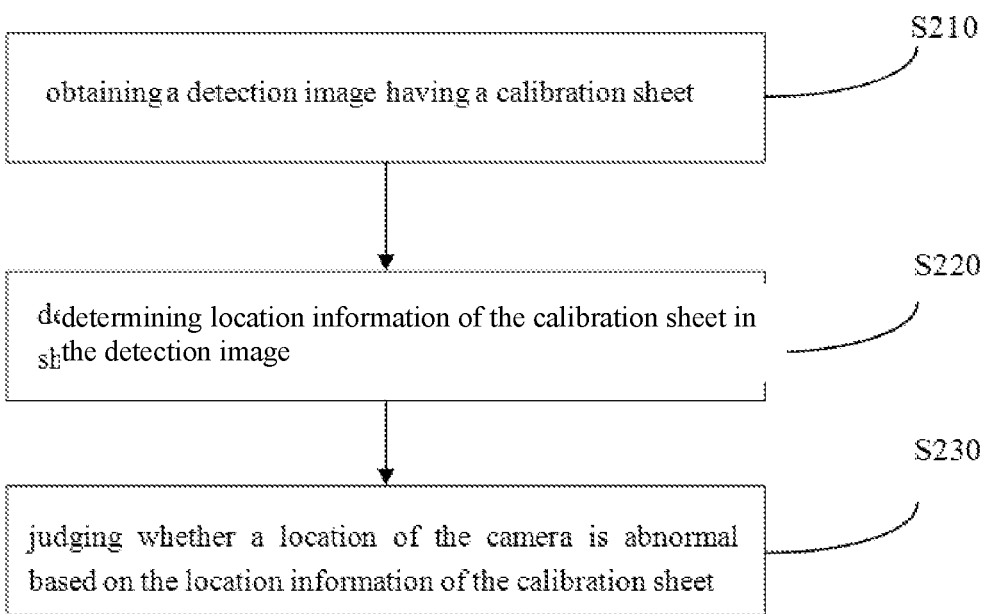
FIG. 2 is a flowchart of an inspection method for a camera according to some embodiments of this application.

FIG. 2 shows a flowchart of an inspection method for a camera provided according to some embodiments of this application.

Embodiments of a second aspect of this application provides an inspection method for a camera, a camera used for obtaining a detection image of coil conveying by the roller in the above embodiment. As shown in FIG. 2, the inspection method for the camera includes:

Step S210: obtaining a detection image having a calibration sheet.

The detection image can be obtained by scanning with the camera, and the detection image having the calibration sheet refers to that the detection image includes a complete calibration pattern.

Step S220: determining location information of the calibration sheet in the detection image.

By identifying the detection image, a feature of the calibration pattern of the calibration sheet is identified, so that the location information of the calibration sheet can be determined according to location coordinates of the feature in the detection image.

Step S230: judging whether a location of the camera is abnormal based on the location information of the calibration sheet.

When the location of the camera is abnormal, it will cause a change in a scanning path of the camera, resulting in a change in the location information of the calibration sheet in the detection image obtained by scanning. Therefore, whether the location of the camera is abnormal can be judged through the location information of the calibration sheet.

Figure 3:
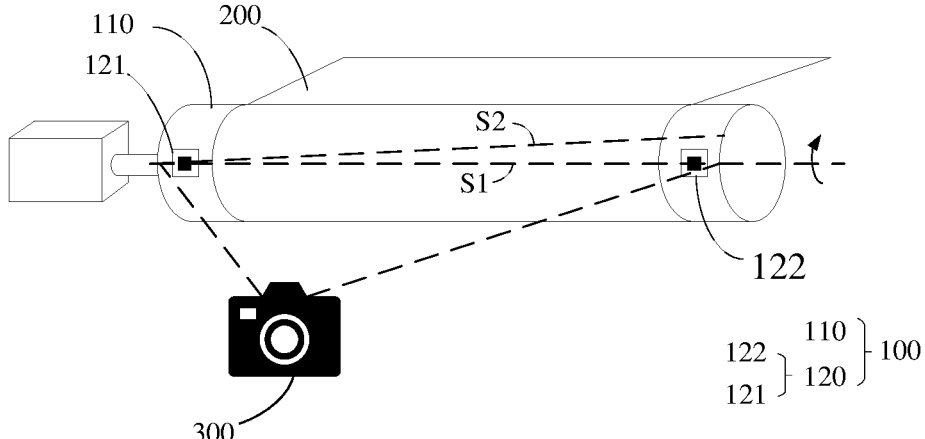
FIG. 3 is a schematic diagram of an inspection method for a camera according to some embodiments of this application.
Figure 4:
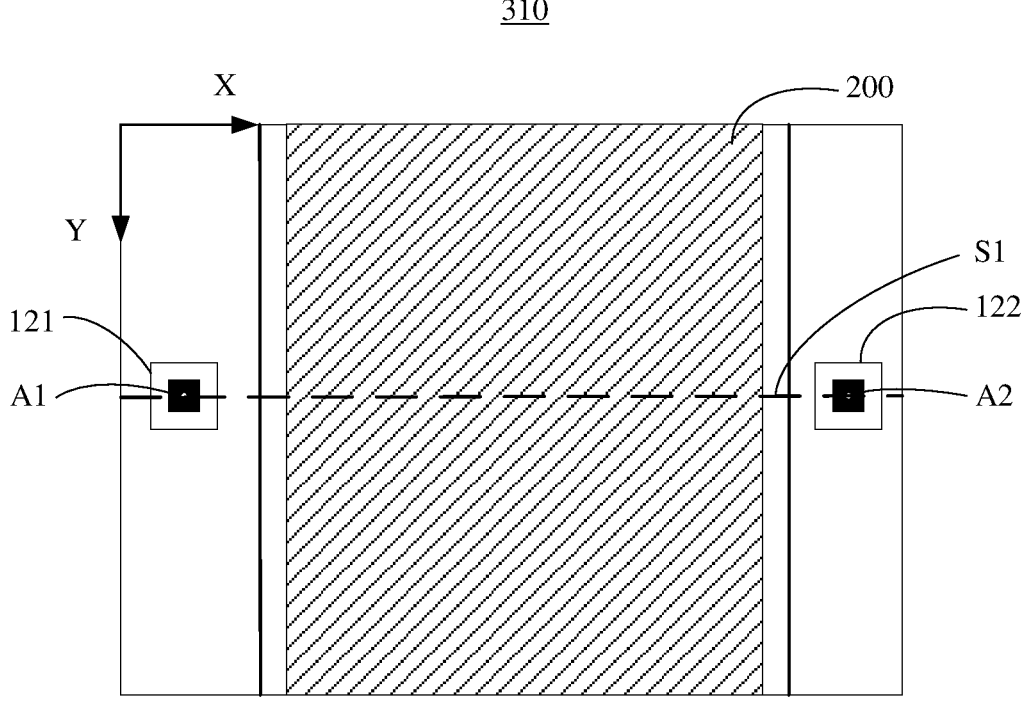
FIG. 4 is a schematic diagram of a detection image according to some embodiments of this application.

FIG. 3 shows a schematic diagram of an inspection method for a camera provided according to some embodiments of this application. FIG. 4 shows a schematic diagram of a detection image provided according to some embodiments of this application.

As shown in FIG. 3 and FIG. 4, a roller surface of a roller body 110 supports a coil 200, and a calibration sheet 120 is arranged on the roller surface of the roller body 110 and avoids the coil 200. The roller body 110 rotates with the calibration sheet 120 under driving of a driving mechanism to convey the coil 200.

After installation and debugging, a camera 300 is set to photograph a roller 100 and the coil 200 along a scanning path S1, where the calibration sheet 120 falls completely within a field of view of the camera 300. The camera 300 may be a line-scan Charge Coupled Device (CCD) image sensor or a line-scan Complementary Metal Oxide Semiconductor (CMOS) image sensor.

The camera 300 periodically photograph according to a rotation angle of a roller, for example, the line-scan CCD image sensor performs scanning line by line according to a set number of differential signals to obtain a detection image with a preset resolution. In some examples, as shown in FIG. 4, the camera can be set to photograph one line along the scanning path S1 for every 1 degree rotation of the roller, so that a pixel line with a single pixel width and a resolution of X×1 is obtained (X represents a pixel length in a direction of the scanning path S1). The roller rotates Y degrees, and the camera can collect Y pixel lines. The Y pixel lines are spliced in sequence along the collection time to form a detection image 310 with a resolution of X×Y.

A horizontal direction of the detection image 310 is the same as a scanning path direction of a scanning camera. The detection image 310 includes an image feature of the coil 200 and an image feature of the calibration sheet 120. By identifying the calibration pattern of the calibration sheet in the detection image, the location of the calibration sheet in the detection image can be determined.

When the location of the camera is abnormal, such as an angle offset, the camera cannot be adjusted according to preset calibration during scanning to make the scanning path S1 perform scanning, for example, when scanning is performed according to a scanning path S2 after offset, an obtained detection image will be deformed, and the location of the calibration pattern of the calibration sheet in the detection image will change. Therefore, whether the location of the camera is abnormal can be judged through the location information of the calibration sheet in the detection image.

Whether the detection image is deformed is judged through the location information of the calibration sheet in the detection image, the calibration sheet staggered with a coil on a roller body, thereby judging whether the location of the camera is abnormal, which can achieve real-time and continuous inspection of the camera without affecting the normal conveying of the coil, reducing the workload and cost of inspection.

In some embodiments, the Step S230 includes:

calculating an offset parameter of a location of the calibration sheet in the detection image relative to a preset reference location based on the location information of the calibration sheet and preset reference location information; and judging whether the location of the camera is abnormal based on the offset parameter.

The location information of the calibration sheet includes pixel coordinates of the calibration sheet in the detection image. The preset reference location is a preset location of the calibration sheet in a normal detection image obtained by the camera under a normal state. The preset reference location information includes pixel coordinates of the calibration sheet in the normal detection image. The offset parameter is a parameter that measures an offset degree of the location of the calibration sheet in the detection image relative to the preset reference location, such as one or more of an offset distance, an offset angle, and a distance in a direction of any coordinate axis.

By calculating the offset parameter of the location of the calibration sheet in the detection image relative to the preset reference location and according to the offset parameter, an abnormal degree of the location of the camera can be quantitatively judged, thereby improving the accuracy of camera inspection.

Figure 5:
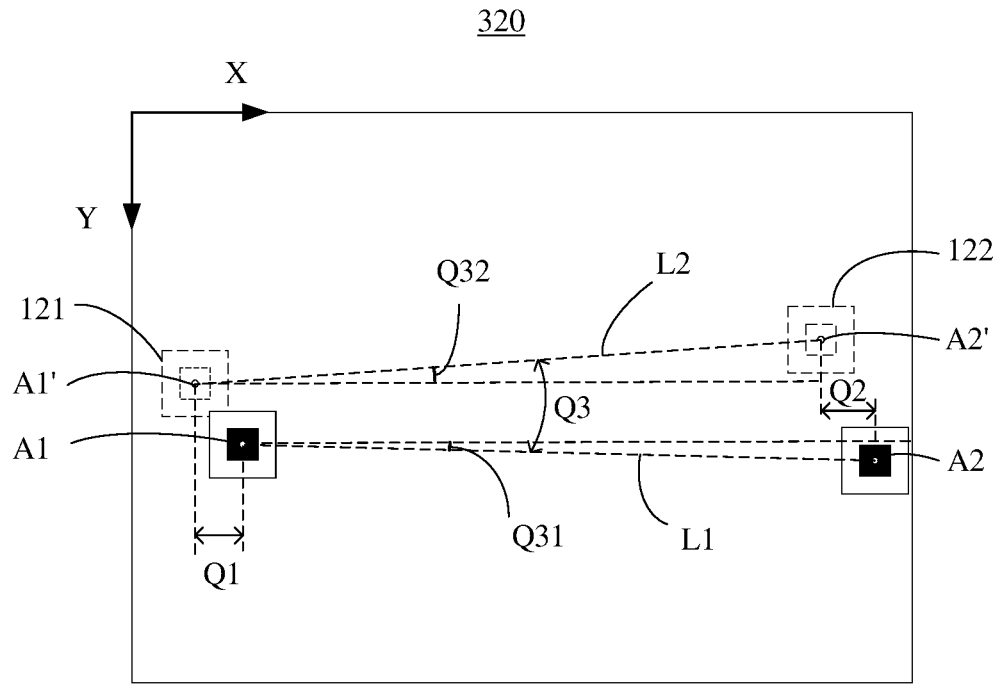
FIG. 5 is a schematic diagram of another detection image according to some embodiments of this application.

FIG. 5 shows a schematic diagram of another detection image provided according to some embodiments of this application.

In some embodiments, as shown in FIG. 5, the calibration sheet 120 includes a first calibration sheet 121 and a second calibration sheet 122, the location information of the calibration sheet includes first location information and second location information, the first location information is used to indicate a location A1 of a first feature point in the first calibration sheet 121 in the detection image, and the second location information is used to indicate a location A2 of a second feature point in the second calibration sheet 122 in the detection image; the preset reference location information includes first reference location information and second reference location information, the first reference location information is used to indicate a reference location A1' of the first feature point, and the second reference location information is used to indicate a reference location A2' of the second feature point.

The first feature point is a feature point in a calibration pattern of the first calibration sheet that is easy to identify in an image, and the second feature point is a feature point in a calibration pattern of the second calibration sheet that is easy to identify in an image. For example, when a calibration pattern of a calibration sheet is a square color block, a feature point may be one of angular points of the color block or a center point of the color block. The first feature point and the second feature point may be the same or different feature points in the calibration pattern of the calibration sheet.

The first location information may be pixel coordinates $(x_1, y_1)$ of the location A1 of the first feature point in the detection image 320, the second location information may be pixel coordinates $(x_2, y_2)$ of the location A2 of the second feature point in the detection image 320, the first reference location information may be pixel coordinates $(X_1, Y_1)$ of the reference location A1' of the first feature point, and the second reference location information may be pixel coordinates $(X_2, Y_2)$ of the reference location A2' of the second feature point.

Whether the detection image is deformed can be identified more accurately through the location information of two calibration sheets, thereby more accurately judging that the location of the camera is abnormal and improving the accuracy of camera inspection. By using the location information of feature points that are more easily identified as the location information of calibration sheets, the difficulty of image identification can be reduced, which is conducive to improving the accuracy of location information.

In some embodiments, the offset parameter includes at least one of a first deviation value Q1, a second deviation value Q2 and a third deviation value Q3; and calculating the offset parameter includes at least one of:

(i) calculating the first deviation value Q1 based on the first location information and the first reference location information;

(ii) calculating the second deviation value Q2 based on the second location information and the second reference location information; and (iii) calculating the third deviation value Q3 based on the first location information, the second location information, the first reference location information and the second reference location information.

The first deviation value Q1 is used to indicate an offset condition of the location of the first feature point in the detection image relative to the reference location of the first feature point. The second deviation value Q2 is used to indicate an offset condition of the location of the second feature point in the detection image relative to the reference location of the second feature point. The first deviation value Q1 and the second deviation value Q2 may be one or more of a spacing distance, an offset angle, and a projection distance in a specific direction. The third deviation value Q3 is used to indicate an overall offset condition of the location of the first feature point and the location of the second feature point relative to the reference location.

By using at least one of the offset condition of the first feature point, the offset condition of the second feature point, and the overall offset condition of the first feature point and the second feature point as an offset parameter to judge the offset of the location of the camera, an abnormal condition of the camera can be judged more comprehensively and accurately.

In some embodiments, as shown in FIG. 5, the first deviation value Q1 is an offset distance in a first direction between the location A1 of the first feature point in the detection image and the reference location A1' of the first feature point; the second deviation value Q2 is an offset distance in the first direction between the location A2 of the second feature point in the detection image and the reference location A2' of the second feature point; and the third deviation value Q3 is an included angle formed between a first connecting line L1 connecting the location A1 of the first feature point and the location A2 of the second feature point in the detection image and a second connecting line L2 connecting the reference location A1' of the first feature point and the reference location A2' of the second feature point. In particular, the first direction is a direction different from a vertical direction of the detection image.

A horizontal direction (i.e., an X-axis direction) of a detection image is a scanning direction of a camera. A vertical direction (i.e., a Y-axis direction) of the detection image refers to a direction perpendicular to an X-axis. According to the imaging characteristics of the camera, theoretically, the vertical direction of the detection image can be infinitely long, and a preset length value can be set autonomously to obtain a detection image of a corresponding pixel. Since the vertical direction can be arbitrarily set, pixel coordinates in the vertical direction of the location A1 of the first feature point and the location A2 of the second feature point are not fixed in different detection images. Moreover, a small amount of offset in the vertical direction has little impact on image detection, and larger offset will be clearly reflected in tableau brightness. Therefore, in this embodiment, the offset in the vertical direction cannot be used as a judgment parameter for identifying that the location of the camera is abnormal, but instead, the offset condition in the first direction different from the vertical direction is selected to early alarm for the fact that the location of the camera is abnormal.

In this embodiment, the first direction may be a direction different from the vertical direction of the detection image, such as a direction intersecting the vertical direction of the detection image, or a horizontal direction perpendicular to the vertical direction (i.e., the X-axis direction).

In some examples, the first direction is a horizontal direction. The first deviation value Q1 may be a difference value in pixel coordinates in the X-axis direction between the location A1 of the first feature point and the reference location A1' of the first feature point, i.e.

$$Q1 = |X_1 - x_1|;$$

The second deviation value Q2 may be a difference value in pixel coordinates in the X-axis direction between the location A2 of the second feature point and the reference location A2' of the second feature point, i.e., $$Q2 = |X_2 - x_2|;$$

At this point, the first deviation value Q1 and the second deviation value Q2 can measure the horizontal offset condition of the camera.

The third deviation value Q3 can be calculated according to a difference value between a first included angle Q31 and a reference included angle Q32, the first included angle Q31 being between the first connecting line L1 connecting the location A1 of the first feature point and the location A2 of the second feature point and the X-axis in the horizontal direction, and the reference included angle Q32 being between the second connecting line L2 connecting the reference location A1' of the first feature point and the reference location A2' of the second feature point and the X-axis in the horizontal direction:

$$Q3 = |Q31 - Q32|;$$

-continued $$Q31 = \tan^{-1}\left(\frac{y_2 - y_1}{x_2 - x_1}\right);$$

$$Q32 = \tan^{-1}\left(\frac{Y_2 - Y_1}{X_2 - X_1}\right).$$

At this point, the third deviation value $Q3$ can measure the rotation offset condition of the camera.

According to the embodiment of this application, by using the offset distances in the first direction of the first feature point and the second feature point and the included angle of the connecting lines of the first feature point and the second feature point relative to a connecting line of the preset reference location as offset parameters, in combination with offset parameters of two calibration sheets in a direction different from the vertical direction of the detection image, the offset condition of the calibration sheets can be identified more accurately, thereby improving the accuracy of camera inspection.

In some embodiments, the first feature point is a pattern center of the first calibration sheet 121, and the second feature point is a pattern center of the second calibration sheet 122.

The pattern type of a calibration sheet is usually a regular pattern. For example, a film used as the calibration sheet has a square color block pattern. When the calibration sheet in the detection image is identified, there may be significant errors in pixel coordinates of a single feature point at the edge of the pattern. Due to the need to combine the pixel coordinates of a plurality of feature points of the pattern to determine the center of the pattern comprehensively, the error in the pixel coordinates is relatively small.

In this embodiment, by using a pattern center of a calibration sheet as a corresponding feature point, the accuracy of location information of the feature point during image identification can be improved, thereby improving the precision of image identification and the accuracy of inspection.

In some embodiments, the reference location is a location of the calibration sheet in a first detection image having the calibration sheet obtained by the camera.

After installation, a camera often undergoes a calibration process. The location of the camera after calibration is theoretically in an ideal working state, at this point, an obtained detection image is also a detection image obtained when the location of the camera is normal. At this point, the location of a calibration sheet in a first detection image photographed by the camera can be used as a measurement benchmark to measure whether the location of the camera is normal, particularly, the location of the calibration sheet in the first detection image having the calibration sheet can be stored as a reference location, which is called out for use when subsequent judging whether the location of the calibration sheet in the detection image is offset and the offset degree.

In this embodiment, by using the location of the calibration sheet in the first detection image having the calibration sheet obtained by the camera at a normal location as the preset reference location, a reference location corresponding to the normal location of the camera can be obtained as a benchmark for inspection judgment, which is conducive to improving the accuracy and efficiency of inspection judgment.

In some embodiments, the judging whether the location of the camera is abnormal based on the offset parameter includes:

Judging that the location of the camera is abnormal in response to the offset parameter being greater than a first preset threshold.

The first preset threshold is a judgment threshold preset according to precision requirements of specific usage scenarios. It can be understood that the setting of the first preset threshold corresponds to the offset parameter. In some examples, the first preset threshold can include a distance threshold for measuring an offset distance and/or an angle threshold for measuring an offset angle. For example, when the offset parameter is a first deviation value and/or a second deviation value, the first preset threshold can be 1 millimeter (mm), and when the offset parameter is a third deviation value, the first preset value can be 1 degree.

By setting an acceptable offset value as the first preset threshold according to specific precision requirements, precision control during inspection can be ensured, thereby accurately identifying that the location of the camera is abnormal.

In some embodiments, the inspection method for the camera further includes: sending alarm information and/or adjustment information in response to that the location of the camera is abnormal.

When an inspection result shows that the location of the camera is abnormal, alarm information can be sent to remind an operator to conduct inspection and maintenance. The alarm information may be various forms of alarm signals. In some examples, when an inspection result shows that the location of the camera is abnormal, an adjustment signal can also be sent to control an additional adjustment mechanism to adjust the location of the camera. For example, the adjustment mechanism may be a pan-tilt for installation of a camera. According to the detected offset condition of the location of the camera, the offset of the camera can be adjusted to restore to a set normal location.

The alarm information and/or the adjustment information are/is sent in time when it is detected that the location of the camera is abnormal, so that the location of the camera can be adjusted in time, thereby avoiding the influence on a subsequent visual detection process.

In some embodiments, the adjustment information is sent to control the location of the camera to be adjusted in response to the offset parameter being greater than the first preset threshold and less than or equal to a second preset threshold; and sending the alarm information in response to the offset parameter being greater than the second preset threshold, wherein the second preset threshold is greater than the first preset threshold.

The first preset threshold and the second preset threshold are threshold parameters set according to an acceptable offset degree and an automatically adjusted adjustment range. When the offset parameter is less than or equal to the first threshold, it is judged that the offset degree of a current camera is extremely low and will not affect a visual detection result. When the offset parameter is greater than the first preset threshold and less than or equal to the second preset threshold, it is judged that it is necessary to adjust the offset degree of the current camera, and the adjustment information is sent to control the location of the camera to be adjusted by the additional adjustment mechanism. When the offset parameter is greater than the second preset threshold, it is judged that the offset degree of the current camera is larger and exceeds the adjustment range of the adjustment mechanism, the adjustment cannot be completed by relying on the adjustment mechanism, and the alarm information is sent to remind the operator of shutdown for detection, adjustment, or even recalibration of the camera.

In this embodiment, particularly, the offset degree of the camera is judged according to results obtained by inspection, and different control commands are sent according to different degrees, which can achieve automatic inspection and automatic adjustment to the maximum extent, thereby reducing times of downtime while ensuring detection precision and avoiding the influence on production efficiency.

Figure 6:
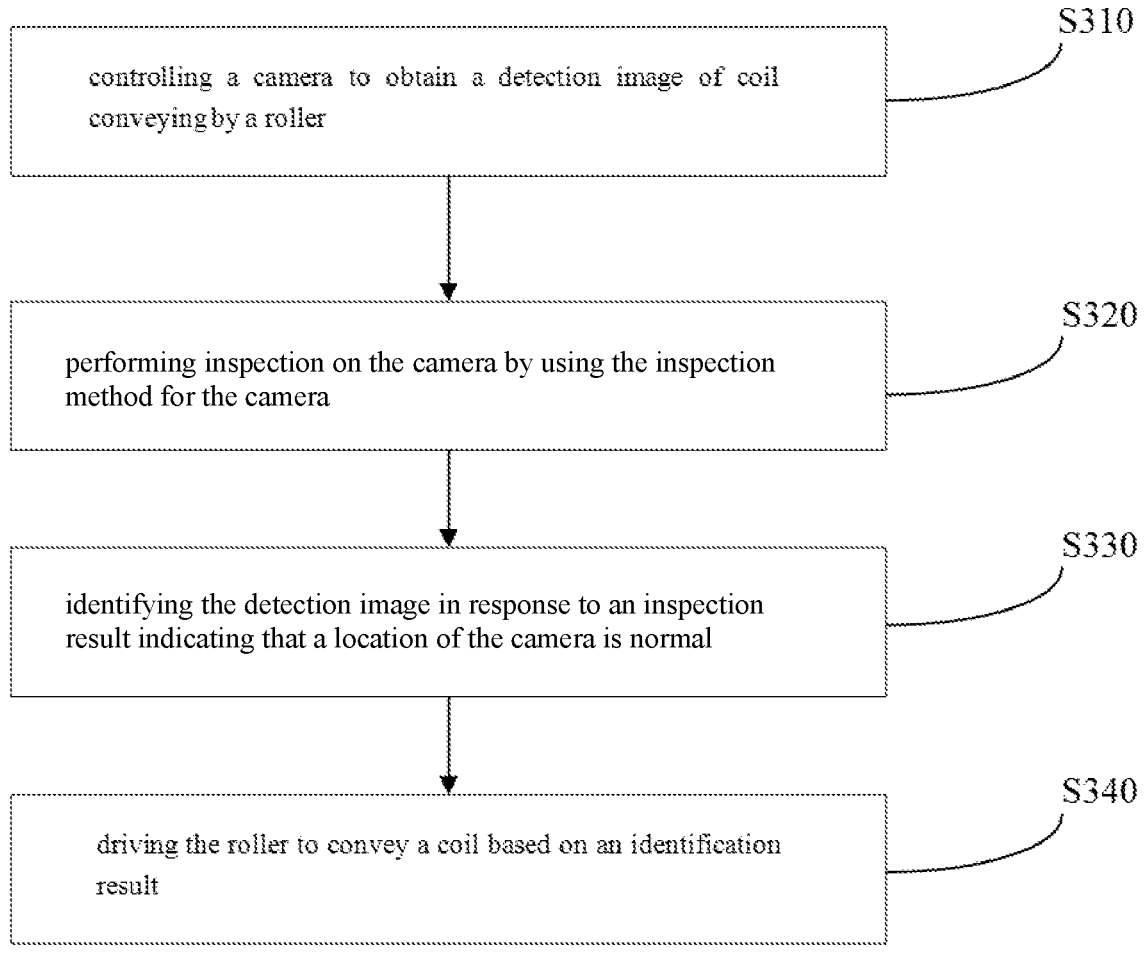
FIG. 6 is a flowchart of a coil conveying method according to some embodiments of this application.

FIG. 6 shows a flowchart of a coil conveying method provided according to some embodiments of this application.

Embodiments of a third aspect of this application provide a coil conveying method.

As shown in FIG. 6, the coil conveying method includes:

Step S310: controlling a camera to obtain a detection image of coil conveying by a roller;

Step S320: performing the inspection on the camera by using the inspection method for the camera above;

Step S330: identifying the detection image in response to an inspection result indicating that a location of the camera is normal; and Step S340: driving the roller to convey a coil based on an identification result.

In examples, both the inspection on the camera and the visual detection on film coil conveying are performed by identifying images collected by the camera. When an inspection result of the camera shows that it is qualified, it means that the location of the camera at this time can meet the requirements of visual detection, so that the detection images collected by the camera can be directly identified to detect whether a coil conveying state is abnormal.

According to the embodiment of this application, by combining the camera inspection with the visual detection of coil conveying, the inspection on the camera can be completed while the visual detection is performed on coil conveying, there is no need to shut down to interrupt production for inspection, and the abnormality of the camera can be found in time, thereby avoiding the influence on the accuracy of visual detection results of coil conveying.

Figure 7:
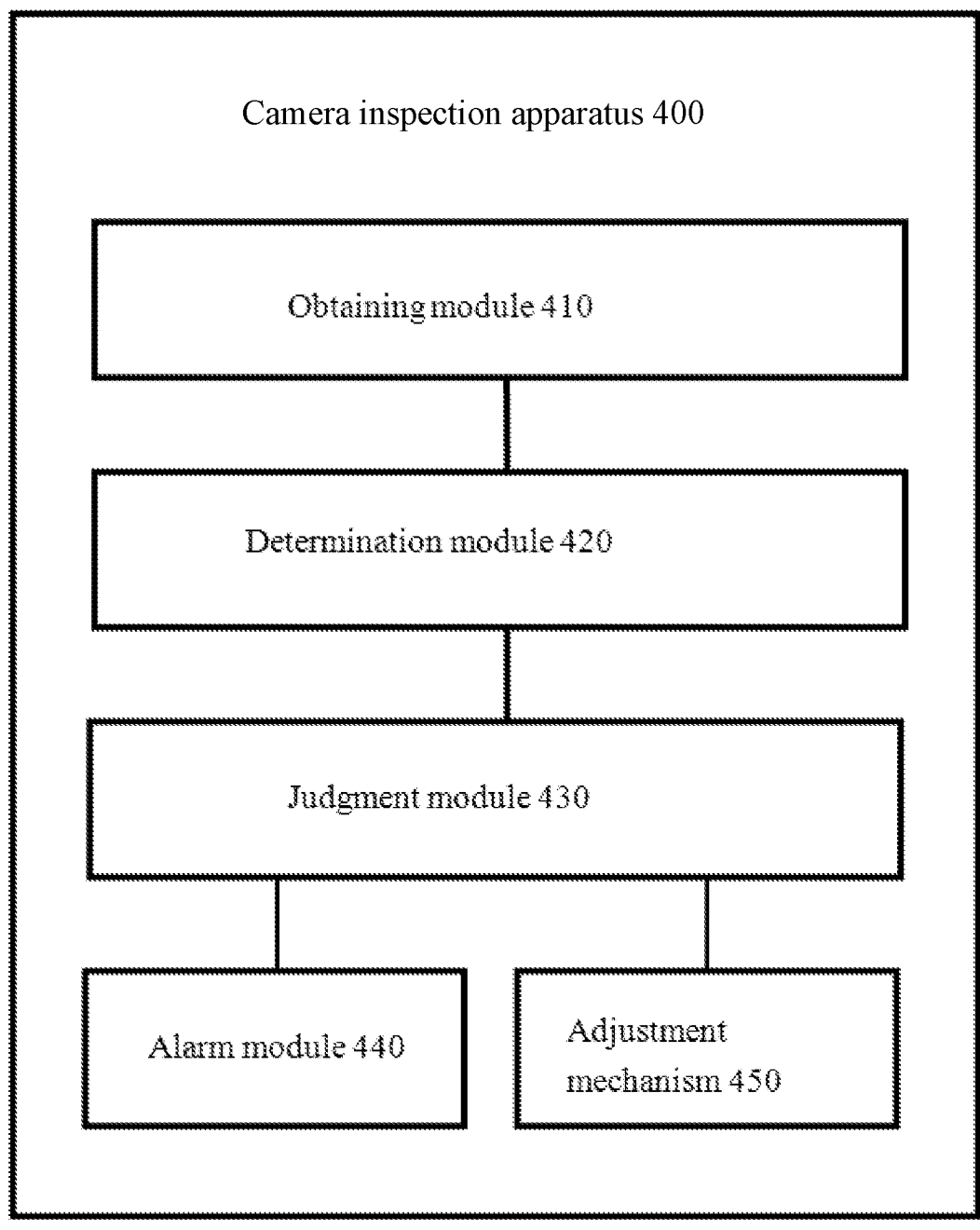
FIG. 7 is a structural block diagram of a camera inspection apparatus according to some embodiments of this application.

FIG. 7 shows a structural block diagram of a camera inspection apparatus provided according to some embodiments of this application.

Embodiments of a fourth aspect of this application provide a camera inspection apparatus 400. As shown in FIG. 7, the camera inspection apparatus 400 includes an obtaining module 410, a determination module 420 and a judgment module 430. The obtaining module 410 is configured to obtain a detection image having a calibration sheet; the determination module 420 is configured to determine location information of the calibration sheet in the detection image; and the judgment module 430 is configured to judge whether a location of a camera is abnormal based on the location information of the calibration sheet.

In some embodiments, the camera inspection apparatus further includes an alarm module 440, configured to send alarm information in response to an inspection result indicating that the location of the camera is abnormal.

In some embodiments, the camera inspection apparatus further includes an adjustment mechanism 450, configured to adjust the location of the camera in response to the inspection result indicating that the location of the camera is abnormal.

The adjustment mechanism 450 may be an automatic adjustment mechanism, which adjusts the location of the camera to restore to the normal location according to the received adjustment information or alarm information sent based on the inspection result. It can be understood that the action of the adjustment mechanism may be controlled by the adjustment information or the alarm information. In some examples, the adjustment mechanism 450 can control a corresponding adjustment amount according to the offset parameter of the calibration sheet in the inspection result.

Figure 8:
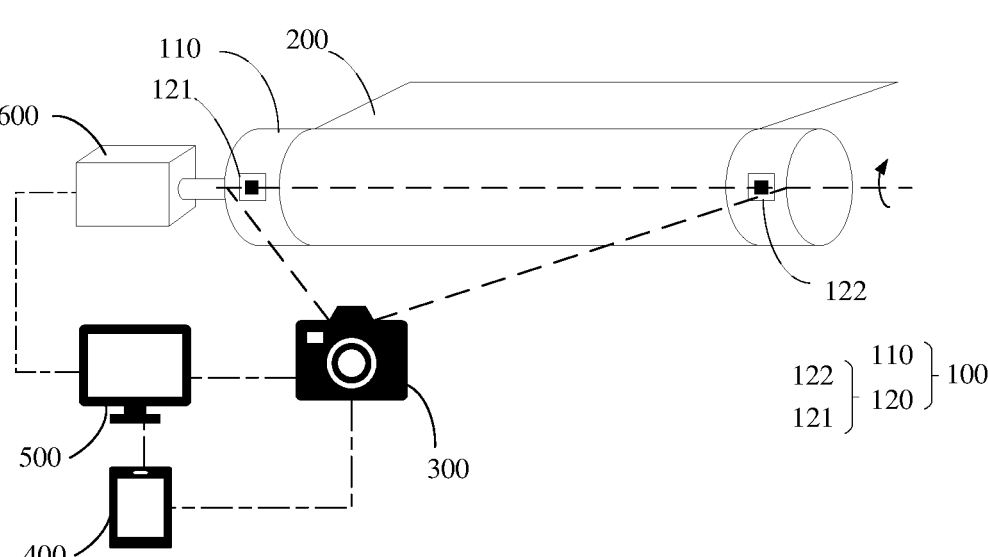
FIG. 8 is a schematic structural diagram of a coil conveying apparatus according to some embodiments of this application.

FIG. 8 shows a schematic structural diagram of a coil conveying apparatus provided according to some embodiments of this application.

Embodiments of a fifth aspect of this application provide a coil conveying apparatus 1000. As shown in FIG. 8, the coil conveying apparatus 1000 includes: a roller 100, a camera 300, a camera inspection apparatus 400, an identification module 500 and a driving mechanism 600. The camera inspection apparatus 400 is used to perform inspection on the camera 300; the identification module 500 is configured to identify a detection image obtained by the camera 300 in response to an inspection result indicating that a location of the camera 300 is normal; and the driving mechanism 600 is configured to drive the roller 100 to convey a coil 200 based on an identification result for the detection image.

In some examples, the camera inspection apparatus 400 and the identification module 500 may be two independent processing modules or two parts of a processing module, or the functions of the camera inspection apparatus 400 and the identification module 500 may be implemented simultaneously by an integrated processing module, such as an industrial personal computer, which, as a terminal device for image processing, implements the functions of the camera inspection apparatus 400 and the identification module 500 by executing a preset program.

The driving mechanism 600 may be any automated driving device, such as a servo motor.

Embodiments of a sixth aspect of this application provide an electronic device, including: at least one processor; and a memory connected to the at least one processor in communication, wherein the memory stores instructions that can be executed by the at least one processor, and the instructions are executed by the at least one processor to enable the at least one processor to execute the inspection method for the camera of any one of the above or the coil conveying method.

The various implementations of the systems and technologies described above herein can be implemented in digital electronic circuit systems, integrated circuit systems, Field Programmable Gate Array (FPGA), Application Specific Integrated Circuit (ASIC), Application Specific Standard Product (ASSP), System on Chip (SOC), Complex Programming Logic Device (CPLD), computer hardware, firmware, software, and/or combinations of thereof. These various implementations can include: implementation in one or more computer programs. The one or more computer programs can be executed and/or interpreted on a programmable system including at least one programmable processor. The programmable processor may be a dedicated or general-purpose programmable processor that can receive data and instructions from a storage system, at least one input apparatus, and at least one output apparatus, and transmit the data and the instructions to the storage system, the at least one input apparatus, and the at least one output apparatus.

Embodiments of a seventh aspect of this application provide a computer-readable storage medium, storing a computer program that, when executed by a processor, implements the inspection method for the camera of any one of the above or the coil conveying method.

The computer-readable medium may be a tangible medium that can include or store programs for use by or in combination with instruction execution systems, apparatuses, or devices. A machine-readable medium may be a machine-readable signal medium or a machine-readable storage medium. The machine-readable medium may include, but is not limited to, electronic, magnetic, optical, electromagnetic, infrared, or semiconductor systems, apparatuses, or devices, or any suitable combination of the above. More specific examples of the machine-readable storage medium may include electrical connections based on one or more wires, portable computer disk, hard disk, Random Access Memory (RAM), Read-Only Memory (ROM), Erasable Programmable Read-Only Memory (EPROM or flash memory), optical fiber, portable Compact Disc-Read Only Memory (CD-ROM), optical storage devices, disk storage devices, or any suitable combination of the above.

Embodiments of an eighth aspect of this application provide a computer program product, including a computer program that, when executed by a processor, implements the inspection method of the camera of any one of the above or the coil conveying method.

Figure 9:
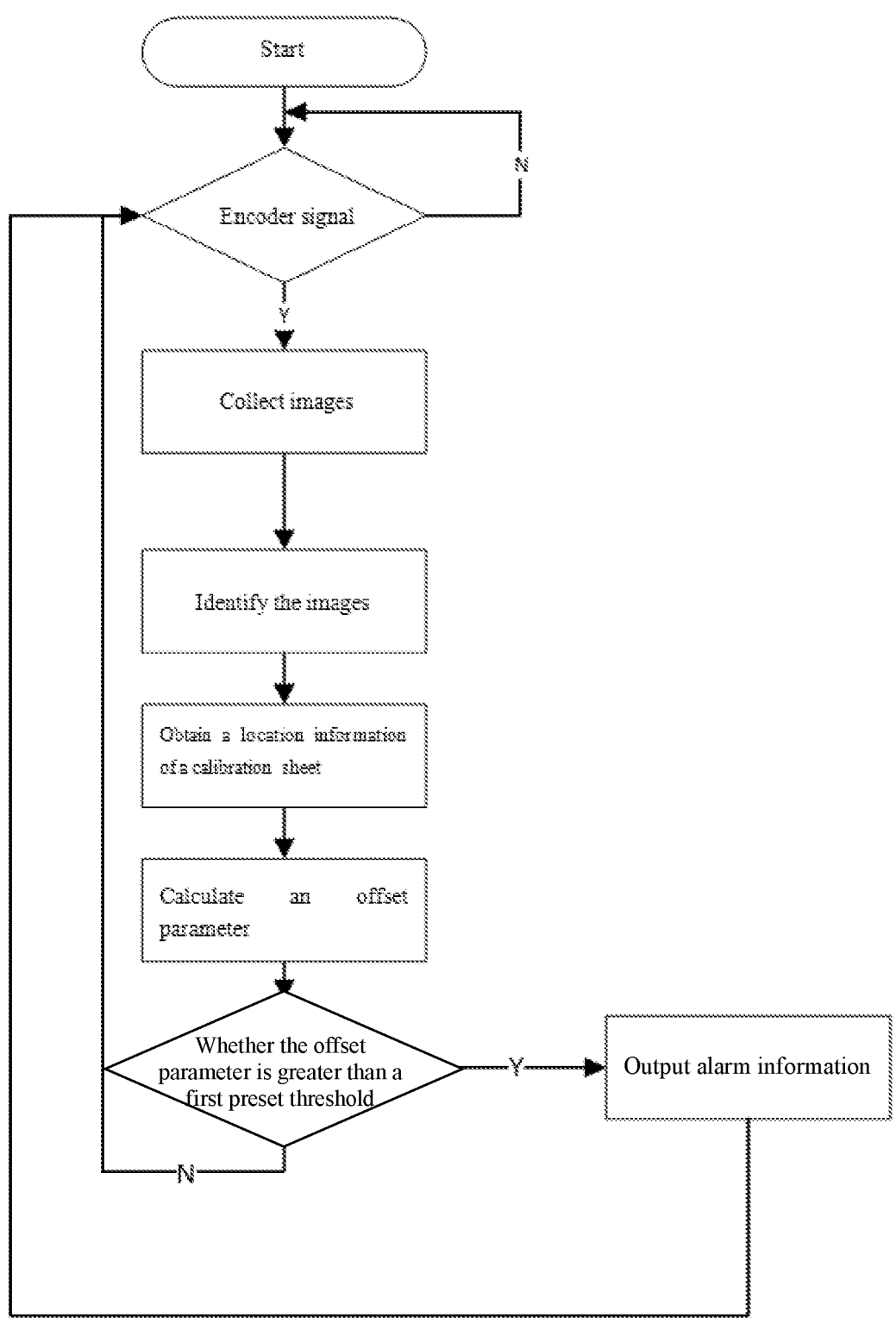
FIG. 9 is a workflow chart of an inspection method for a camera according to some embodiments of this application.

FIG. 9 shows a workflow chart of an inspection method for the camera provided according to some embodiments of this application.

As shown in FIG. 5, FIG. 8 and FIG. 9, a workflow of the inspection method for the camera mainly includes the following:

An encoder periodically sends an encoder signal to a camera according to a rotation angle of a roller. The roller is the roller described in the above embodiment. A first calibration sheet and a second calibration sheet are stuck to two ends of a roller surface.

The camera periodically collects images according to the received encoder signal to obtain a detection image with a preset resolution.

Identifying the detection image having the first calibration sheet and the second calibration sheet specifically includes:

firstly, judging whether a current detection image is an RBG color triple-channel picture according to detection image information, wherein if the current detection image is a color picture, the color triple-channel picture firstly needs to be converted into a black and white single-channel picture, and if the current detection image is a black and white picture, the next step is directly performed without processing;

preprocessing: processing the detection image by using one or more filtering methods such as mean filtering, Gaussian filtering and median filtering, so as to make a tableau more pure and smoother in transition, prevent noise from interfering with the tableau, and remove fine burrs on an object surface in the image;

thresholding processing: screening out all regions with gray values within a certain range according to the processed detection image;

segmenting connected domains: distinguishing all eligible regions into independent regions; and screening these regions in the image according to the characteristics of a film; and judging whether there is a connected domain that conforms to the characteristics of the film. If there is a region that conforms to the characteristics of the film, it indicates that the film is found in the image, location coordinates $(x_1, y_1)$ of a first feature point located at a pattern center of the first calibration sheet and location coordinates $(x_2, y_2)$ of a second feature point located at a pattern center of the second calibration sheet are calculated and output, and included angles between feature points at pattern centers of two films and a horizontal line of the detection image are then calculated. If there is no region that conforms to the characteristics of the film, it indicates that the location of the film is not found in the image, and the film may be obstructed or an image sensor may be significantly moved, at this point, coordinates (−999, −999) of an abnormal location and an included angle $\angle$−999° need to be output.

Offset parameters are calculated according to the identified location coordinates and included angles as well as the location coordinates and included angles of a preset reference location, wherein the offset parameters include a first deviation value Q1 of the first feature point in a horizontal direction, a second deviation value Q2 of the second feature point in the horizontal direction, and a third deviation value Q3 of a connecting line of the first feature point and the second feature point relative to the reference location.

Threshold judgment: a first preset threshold is a preset acceptable offset range in the horizontal direction of the image sensor, such as 1 mm, and when the first deviation value Q1 and the second deviation value Q2 are greater than this threshold, it indicates that the image sensor of the camera has undergone significant offset. For a line-scan image sensor that is generally used in conjunction with linear light, the third deviation value Q3 is a preset acceptable range of a tilt angle of the image sensor, such as 1°, and when the third deviation value Q3 is greater than this threshold, it indicates that the camera has undergone significant rotation. When any of the first deviation value Q1, the second deviation value Q2, or the third deviation value Q3 is greater than the first preset threshold, it is necessary to adjust the camera, and even suspend operation in time and conduct inspection and maintenance.

Output of alarm signal: when the offset parameter is greater than the first preset threshold, it is considered to be beyond the acceptable range, an inspection result is output, and an output signal may be various forms of alarm signals to remind an operator to conduct inspection and maintenance.

Finally, it should be noted that the above respective embodiments are merely used to illustrate the technical solution of this application and not to limit it. Although this application has been described in detail with reference to the aforementioned respective embodiments, a person of ordinary skill in the art should understand that they can still amend the technical solutions recorded in the aforementioned respective embodiments, or equivalently replace some or all of the technical features; however, these amendments or replacements do not separate the essence of the corresponding technical solutions from the scope of the technical solutions of the various embodiments of this application, and they should all be covered within the scope of the claims and description of this application. Especially, as long as there is no structural conflict, the various technical features mentioned in various embodiments can be combined in any way. This application is not limited to the specific embodiments disclosed herein, but includes all technical solutions falling within the scope of the claims.

What is claimed is:

1. An inspection method for a camera, the camera being configured for obtaining a detection image of workpiece conveying by a roller, the roller comprising:

a roller body, comprising a roller surface for supporting a workpiece; and a calibration pattern located on the roller surface of the roller body and avoiding the workpiece, the calibration pattern being configured for camera inspection, the method comprising:

obtaining a detection image having a calibration pattern;

determining location information of the calibration pattern in the detection image; and judging whether a location of the camera is abnormal based on the location information of the calibration pattern.

2. The inspection method for a camera of claim 1, wherein the judging whether a location of the camera is abnormal based on the location information of the calibration pattern comprises:

calculating an offset parameter of a location of the calibration pattern in the detection image relative to a preset reference location based on the location information of the calibration pattern and preset reference location information; and judging whether the location of the camera is abnormal based on the offset parameter.

3. The inspection method for a camera of claim 2, wherein the calibration pattern comprises a first calibration pattern and a second calibration pattern, the location information of the calibration pattern comprises first location information for indicating a location of a first feature point in the first calibration pattern in the detection image and second location information for indicating a location of a second feature point in the second calibration pattern in the detection image; and the preset reference location information comprises first reference location information for indicating a reference location of the first feature point and second reference location information for indicating a reference location of the second feature point.

4. The inspection method for a camera of claim 3, wherein the offset parameter comprises at least one of a first deviation value, a second deviation value and a third deviation value;

and wherein the calculating an offset parameter of a location of the calibration pattern in the detection image relative to a preset reference location based on the location information of the calibration pattern and preset reference location information comprises at least one of:

calculating the first deviation value based on the first location information and the first reference location information;

calculating the second deviation value based on the second location information and the second reference location information; and calculating the third deviation value based on the first location information, the second location information, the first reference location information and the second reference location information.

5. The inspection method for a camera of claim 4, wherein the first deviation value is an offset distance in a first direction between the location of the first feature point in the detection image and the reference location of the first feature point;

the second deviation value is an offset distance in the first direction between the location of the second feature point in the detection image and the reference location of the second feature point; and the third deviation value is an included angle formed between a first connecting line connecting the first feature point and the second feature point in the detection image and a second connecting line connecting the reference location of the first feature point and the reference location of the second feature point, wherein the first direction is a direction different from a vertical direction of the detection image.

6. The inspection method for a camera of claim 3, wherein the first feature point is a pattern center of the first calibration pattern, and the second feature point is a pattern center of the second calibration pattern.

7. The inspection method for a camera of claim 2, wherein the reference location is a location of the calibration pattern in a first detection image having the calibration pattern obtained by the camera.

8. The inspection method for a camera of claim 2, the judging whether the location of the camera is abnormal based on the offset parameter comprises:

judging that the location of the camera is abnormal in response to the offset parameter being greater than a first preset threshold.

9. The inspection method for a camera of claim 8, further comprising: sending alarm information and/or adjustment information in response to that the location of the camera is abnormal.

10. The inspection method for a camera of claim 9, wherein the adjustment information is sent to control the location of the camera to be adjusted in response to the offset parameter being greater than the first preset threshold and less than or equal to a second preset threshold; and sending the alarm information in response to the offset parameter being greater than the second preset threshold, wherein the second preset threshold is greater than the first preset threshold.

11. The inspection method for a camera of claim 1, additionally comprising:

if said judging whether a location of the camera is abnormal based on the location information of the calibration pattern indicates that a location of the camera is normal, controlling the camera to obtain a detection image of a workpiece conveying by the roller; and driving the roller to convey a workpiece based on an identification result.

12. An electronic device, comprising:

at least one processor; and a memory connected to the at least one processor in communication, wherein the memory stores instructions executable by the at least one processor, and the instructions are executed by the at least one processor to enable the at least one processor to execute the inspection method for a camera of claim 1.

13. A computer-readable storage medium stored with a computer program that, when being executed by a processor, implements the inspection method for a camera of claim 1.

14. A computer program product, comprising a computer program that, when being executed by a processor, implements the inspection method for a camera of claim 1.

15. A camera inspection apparatus, the apparatus comprising: a camera and a roller, the camera being configured for obtaining a detection image of workpiece conveying by the roller, the roller having:

a roller body, comprising a roller surface for supporting a workpiece; and a calibration pattern located on the roller surface of the roller body and avoiding the workpiece, the calibration pattern being configured for camera inspection;

the apparatus further comprising:

a computer programmed to operate as an obtaining module, configured to obtain a detection image having the calibration pattern;

the computer being further programmed to operate as a determination module, configured to determine location information of the calibration pattern in the detection image; and the computer being further programmed to operate as a judgment module, configured to judge whether a location of the camera is abnormal based on the location information of the calibration pattern.

16. The camera inspection apparatus of claim 15, further comprising:

an alarm module, configured to send alarm information in response to an inspection result indicating that the location of the camera is abnormal.

17. The camera inspection apparatus of claim 15, further comprising:

an adjustment mechanism, configured to adjust the location of the camera in response to the inspection result indicating that the location of the camera is abnormal.

18. The camera inspection apparatus of claim 15, wherein:

the computer is further programmed to operate as an identification module, configured to identify a detection image obtained by the camera in response to an inspection result indicating that a location of the camera is normal; and the computer is further programmed to operate as a driving mechanism, configured to drive the roller to convey a workpiece based on an identification result for the detection image.

\* \* \* \* \*